(12) United States Patent
Jiao (10) Patent No.: US 8,499,305 B2
(45) Date of Patent: Jul. 30, 2013

(54) SYSTEMS AND METHODS FOR PERFORMING MULTI-PROGRAM GENERAL PURPOSE SHADER KICKOFF

(75) Inventor: Yang (Jeff) Jiao, San Jose, CA (US)

(73) Assignee: VIA Technologies, Inc., Taipei (TW)

( * ) Notice: Subject to any disclaimer, the term of this patent is extended or adjusted under 35 U.S.C. 154(b) by 302 days.

(21) Appl. No.: 12/905,385

(22) Filed: Oct. 15, 2010

(65) Prior Publication Data

US 2012/0096474 A1 Apr. 19, 2012

(51) Int. Cl.
*G06F 9/46* (2006.01)

(52) U.S. Cl.
USPC .......................................................... 718/107

(58) Field of Classification Search
USPC ................................. 718/100, 107
See application file for complete search history.

(56) References Cited

U.S. PATENT DOCUMENTS

| | | | | |
|---|---|---|---|---|
| 5,353,418 A * | 10/1994 | Nikhil et al. | | 718/108 |
| 6,574,725 B1 * | 6/2003 | Kranich et al. | | 712/31 |
| 7,464,365 B2 * | 12/2008 | Iwamasa et al. | | 717/100 |
| 7,774,765 B2 * | 8/2010 | Rubin et al. | | 717/144 |
| 8,207,975 B1 * | 6/2012 | Molnar et al. | | 345/506 |
| 8,212,825 B1 * | 7/2012 | Everitt et al. | | 345/505 |
| 2007/0091088 A1 * | 4/2007 | Jiao et al. | | 345/426 |
| 2007/0159488 A1 * | 7/2007 | Danskin et al. | | 345/505 |
| 2008/0180450 A1 * | 7/2008 | Dowling | | 345/503 |
| 2009/0241119 A1 * | 9/2009 | Nemirovsky et al. | | 718/103 |
| 2010/0107143 A1 * | 4/2010 | Emberling | | 717/128 |

* cited by examiner

*Primary Examiner* — Van Nguyen
(74) *Attorney, Agent, or Firm* — McClure, Qualey & Rodack, LLP (57) ABSTRACT

Systems and methods for thread group kickoff and thread synchronization are described. One method is directed to synchronizing a plurality of threads in a general purpose shader in a graphics processor. The method comprises determining an entry point for execution of the threads in the general purpose shader, performing a fork operation at the entry point, whereby the plurality of threads are dispatched, wherein the plurality of threads comprise a main thread and one or more sub-threads. The method further comprises performing a join operation whereby the plurality of threads are synchronized upon the main thread reaching a synchronization point. Upon completion of the join operation, a second fork operation is performed to resume parallel execution of the plurality of threads.

20 Claims, 7 Drawing Sheets

SYSTEMS AND METHODS FOR PERFORMING MULTI-PROGRAM GENERAL PURPOSE SHADER KICKOFF

TECHNICAL FIELD

The present application relates generally to a programmable graphics pipeline in a GPU (graphics processing unit) and more particularly to systems and methods for performing multi-program general purpose shader kickoff in a GPU pipeline.

BACKGROUND

Computer graphics processing systems process large amounts of data, including texture data, among others. A texture is a digital image, often rectangular, having a (u, v) coordinate space. The smallest addressable unit of a texture is a texel, which is assigned a specific (u, v) coordinate based on its location. In a texture mapping operation, a texture is mapped to the surface of a graphical model as the model is rendered to create a destination image. In the destination image, pixels are located at specific coordinates in the (x, y) coordinate system. The purpose of texture mapping is to provide a realistic appearance on the surface of objects.

The Direct3D 11 specification from MICROSOFT® defines a new kind of shader known as a compute shader that offers such features as multi-thread support to aid in the development of such graphics-intensive applications as video games. The compute shader provides access to the computing power and bandwidth of SIMD (single instruction, multiple data) cores such as those used in graphics processors. A compute shader is invoked as multiple threads, where the threads are divided into thread groups. While synchronization operations exist to provide ordering of thread execution, such synchronization techniques may be bandwidth and memory intensive.

SUMMARY

Briefly described, one embodiment, among others, is a method for synchronizing a plurality of threads in a general purpose shader in a graphics processor. The method comprises determining an entry point for execution of the threads in the general purpose shader, performing a fork operation at the entry point, whereby the plurality of threads are dispatched, wherein the plurality of threads comprise a main thread and one or more sub-threads. The method further comprises performing a join operation whereby the plurality of threads is synchronized upon the main thread reaching a synchronization point. Upon completion of the join operation, a second fork operation is performed to resume parallel execution of the plurality of threads.

Another embodiment is a graphics system for performing synchronized execution of a plurality of software threads in a general purpose (GP) shader of a graphics pipeline. The system comprises a GP task constructor for creating a record associated with a thread group comprising a plurality of threads, wherein the record comprises a thread group identifier and a thread counter. The system further comprises a thread scheduler for dispatching the plurality of threads in the thread group via a fork operation, wherein the plurality of threads comprise a main thread and one or more sub-threads. The system also comprises a thread monitor configured to monitor, based on a join operation, execution of each of the plurality of threads and monitor arrival at predetermined synchronization points. For such embodiments, the thread counter is utilized to track a number of executed threads at the predetermined synchronization points. Furthermore, the thread scheduler resumes execution of the plurality of threads in parallel based on the value of the thread counter.

Another embodiment is a computer-readable medium having a programmable general purpose (GP) shader for thread synchronization. For such embodiments, the GP shader is configured to assemble a thread group comprising a plurality of threads, wherein the group of threads comprises a main thread and a plurality of sub-threads. The GP shader is further configured to create a record associated with the thread group, wherein the record comprises a thread group identifier and a thread counter for tracking execution of each of the plurality of threads, and perform a thread group kickoff by performing a fork operation, wherein the fork operation comprise dispatching the main thread followed by the plurality of sub-threads. The GP shader is also configured to perform a join operation by synchronizing the plurality of threads at one or more synchronization points and resume execution of the plurality of threads by performing another fork operation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Various embodiments are described for a general purpose (GP) shader within a graphics processing unit (GPU) pipeline that increases performance of graphics applications with a relatively small change in graphics hardware from the standpoint of gate count and hardware complexity. In particular, various embodiments are described for reducing the overhead involved in transitioning back and forth to a separate application programming interface (API) and associated software stack, which consumes valuable central processing unit (CPU) cycles. Inter-thread communication is leveraged to reduce the amount of data transferred back and forth between the GPU and system memory. The various embodiments described provide a flexible approach to thread kickoff such that the embodiments of the GP shader are not tied to particular inputs and outputs. In this regard, thread execution and flow control between threads are described for exemplary GP shaders.

Various embodiments of a GP shader are described in the context of a graphics system and in particular, in an execution unit (EU) in which thread invocations are decoupled from the input and output domains. Additionally, threads are synchronized at a thread group level where data may be shared between threads. The embodiments described also provide for random access writes based on scatter operations. As one of ordinary skill will appreciate, the GP shaders described may be utilized to perform such functions as QTM, DBK, and post-processing. Such tasks as video decoding and other GP shader applications may involve multi-program execution. In this nonlimiting example, video decoding via QTM/DBK techniques may be mapped to multiple GP shaders by configuring a program counter (PC) corresponding to the GP shader for one shader program followed by a thread group kickoff. The PC is programmed to correspond to another shader program and so on.

In accordance with various embodiments, thread group kickoff and thread synchronization are performed based on combinations of fork and join operations. A program or thread is selected and used as the entry point to the main program that invokes multiple thread groups to be dispatched. As an example of a thread group, consider a video decoding program that comprises a QTM phase and a DBK phase. These two phases may be mapped to two GP shader programs, with the QTM phase being further separated into an inter-prediction program and an intra-prediction program. The entry point serves as the "entrance" to the main program among the dispatched thread groups.

For various embodiments of the GP shader, various tasks or threads concurrently undergo kickoff as one thread group. For purposes of this disclosure, a fork operation or fork phase generally refers to activating or dispatching of one or more threads. For some implementations, this may comprise activating both sub-threads and/or a main thread. A join operation or join phase generally refers to the process in which sub-threads arrive at a portion of code and branch to a next barrier or synchronization point, whereby sub-threads that reach the barrier or synchronization point first are suspended until all the remaining sub-threads arrive. The main thread does not branch to the barrier and instead, continues execution within the join phase.

For some implementations, a thread group may comprise up to 64 EU threads, or the equivalent of 1024 software threads. Multiple threads are grouped together prior to undergoing kickoff. For the threads associated with the same thread group, a fork phase and join phase are incorporated for thread execution and flow control. For some embodiments of the GP shader, thread execution begins with the fork phase, whereby all the threads in a defined thread group undergo kickoff concurrently. The threads later synch up at one or more join phases, which involve join operations and synchronization points. Specifically, for some implementations, this may comprise inserting a join instruction at the beginning of shader code designated for thread synchronization. Note that for implementations in which the GP shader is embodied as shader code, the shader code is stored on a tangible medium such as a computer-readable medium and executed by a processor, as described in more detail below.

When embodied in hardware, the GP shader may be configured to perform thread kickoff with a fork phase. From here, the first fork phase may be succeeded by a join phase. Alternatively, the first fork phase may be followed by another fork phase. For some implementations of the join phase, a counter is utilized to track the number of threads that have completed execution up to that particular section of code. The threads that have arrived are suspended until the remaining threads catch up. Various components in a system in which embodiments of the GP shader operate are now described followed by a description of the operation of these components.

Figure 1:
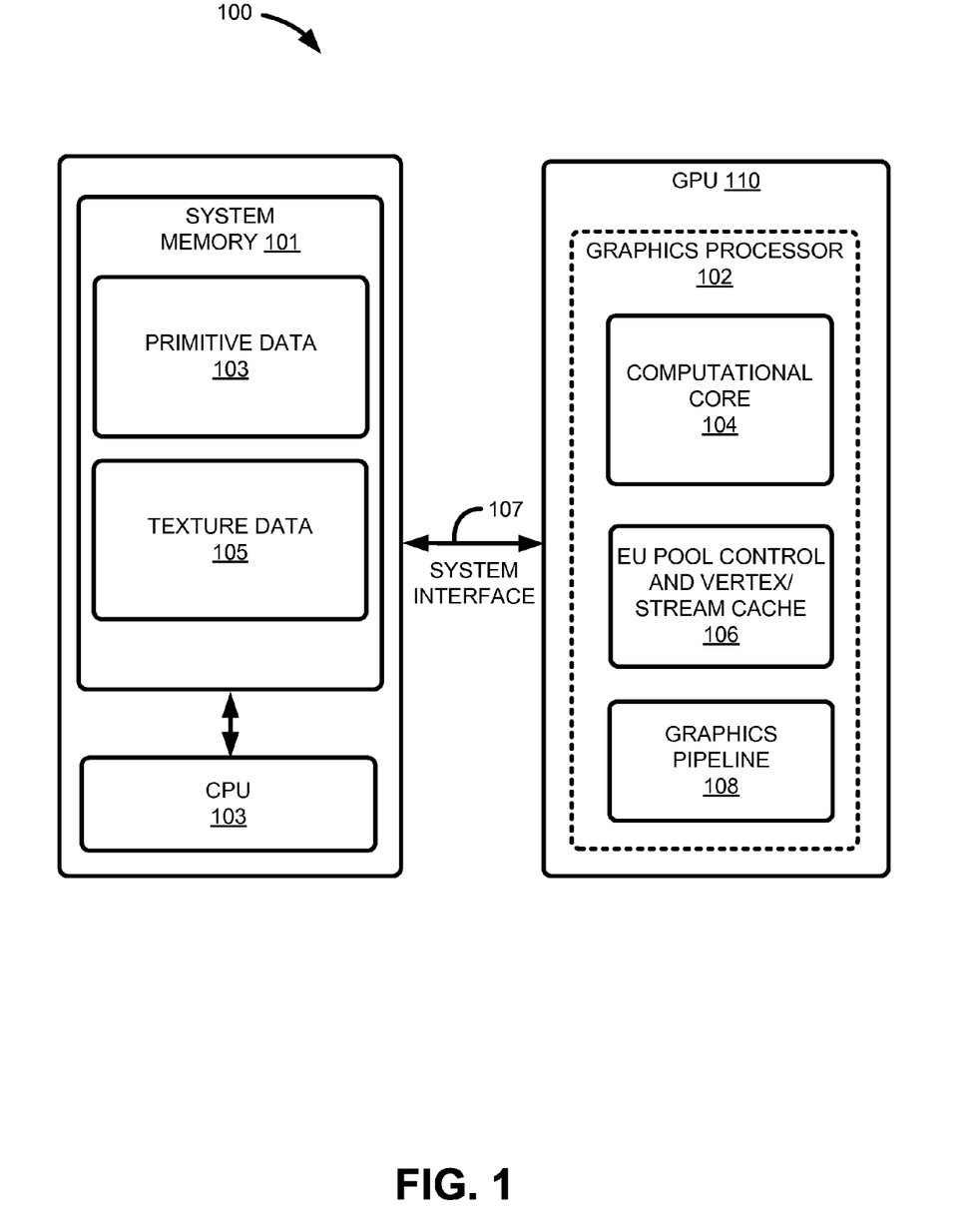
FIG. 1 is a functional block diagram illustrating a graphics system in which embodiments of a general purpose (GP) shader are implemented.

Reference is made to FIG. 1, which is a functional block diagram illustrating a graphics system in which embodiments of a general purpose (GP) shader are implemented. In some implementations, the graphics processor system 100 may be configured as a computer system. The graphics processor system 100 includes a graphics processing unit (GPU) 110, which further comprises a graphics processor 102. The graphics processor 102 also comprises a multiple execution unit (EU), computational core 104, also known as a software programmable core processing unit, that in one embodiment, comprises the GP shader described herein. The graphics processor 102 also comprises an execution unit pool (EUP) control and vertex/stream cache unit 106 (herein, EU pool control unit 106) and a graphics pipeline 108. The computational core 104 comprises a pool of multiple execution units to meet the computing requirements imposed by shader tasks associated with various shader programs, including a vertex shader, geometry shader, and/or pixel shader, processing data for the graphics pipeline 108. As the functionality of the GP shader in one embodiment is implemented largely in the computational core 104, a general description of an embodiment of a graphics processor 102 is described.

The various embodiments of the GP shader may be implemented in hardware, software, firmware, or a combination thereof. When implemented in software, the GP shader is embodied as one or more programs stored on a computer-readable medium for execution by a processor, such as the graphics processor 102 shown in FIG. 1. In accordance with some embodiments, the GP shader is implemented in hardware and firmware, and includes any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The graphics system 100 also includes a CPU 103 and a system memory 101. The CPU 103 performs various functions, including determining information, such as a viewpoint location, which provides for the generation of 3D graphic images. The system memory 101 stores a variety of data, including graphics primitive data 103, display data, and texture data 105. As shown, the CPU 103 and system memory 101 interfaces with the GPU 110 through a system interface 107.

Figure 2:
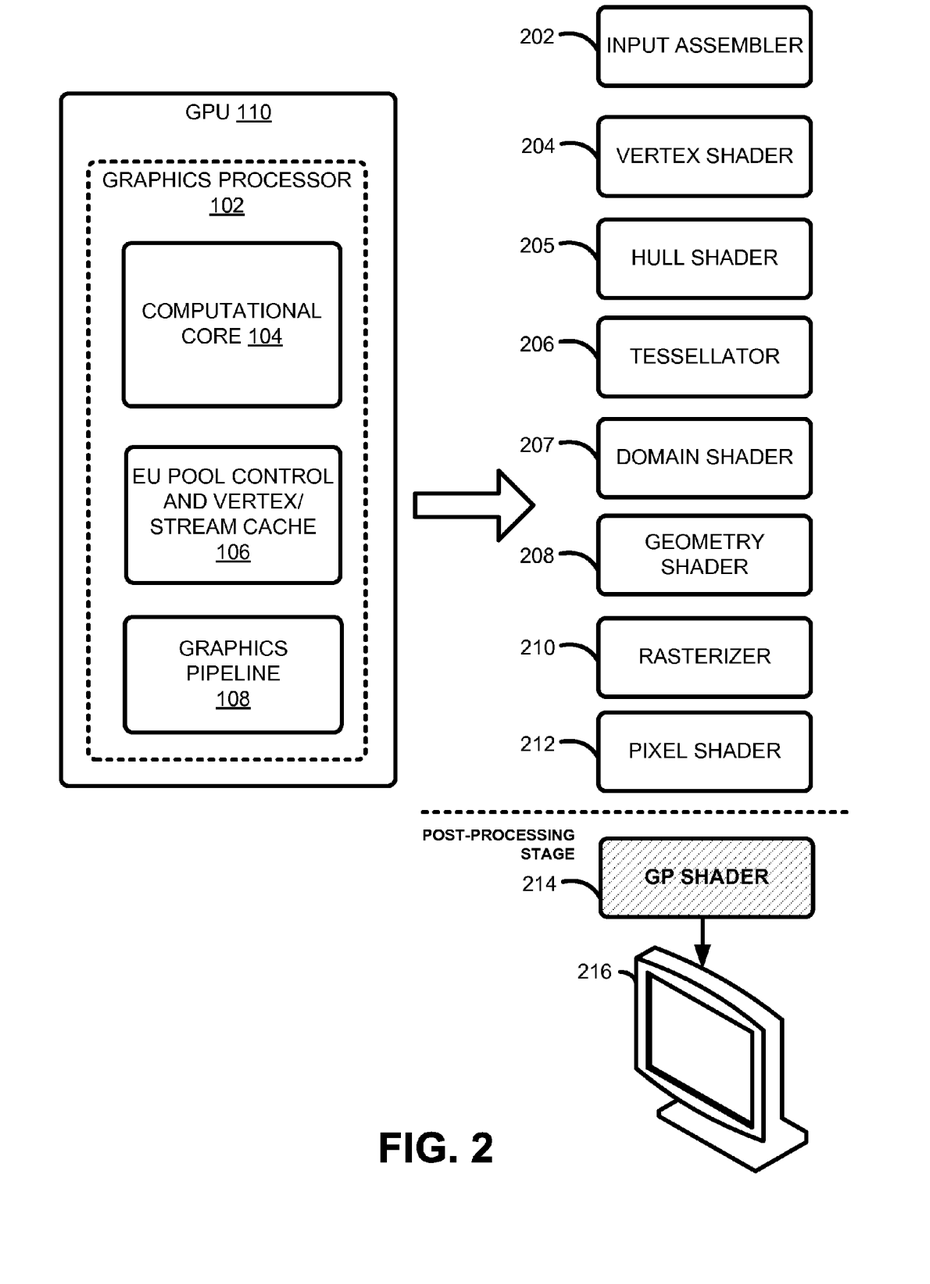
FIG. 2 is a block diagram that illustrates various components of the graphics pipeline shown in FIG. 1.

FIG. 2 is a block diagram that illustrates various components of the graphics pipeline 108 shown in FIG. 1. Specifically, the components illustrated in FIG. 2 comprise components of the graphics pipeline 108 that cooperate, in whole or in part, with a GP shader 214. The graphics pipeline 108 comprises an input assembler 202, which fetches or generally receives vertex data from the system memory 101 using index buffers, and assembles primitives for further processing in the computational core 104. Note that system memory 101 may comprise local memory, among other memory subsystems such as a stream and vertex cache. The primitives, once assembled, are passed to the vertex shader 204.

The vertex shader 204 processes vertices by performing operations such as transformations, skinning, and lighting. The graphics pipeline 108 further comprises a hull shader 205, a tessellator 206, and a domain shader 207. Generally, these shaders 205, 206, 207 are utilized to enhance the smoothness of a given surface. In short, the hull shader 205 is directed to the selection of control points of a curve and is called for each patch, using the patch control points from the vertex shader 204 as inputs. Among other functions, the hull shader 205 computes tessellation factors, which are passed to the tessellator 206. This allows for adaptive tessellation, which can be used for continuous view-dependent LOD (level of detail). The data from the domain shader 207 is passed to the geometry shader 208.

The geometry shader 208 receives, as inputs, vertices for a full primitive, and is capable of outputting multiple vertices that form a single topology, such as a triangle strip, a line strip, point list, etc. The geometry shader 208 performs various functions, including shadow volume generation, and outputs information to the rasterizer 210, which performs clipping, primitive setup, and determines when and/or how to invoke the pixel shader 212. The pixel shader 212 is invoked for each pixel covered by the primitive that is output by the rasterizer 208. The GP shader 214 performs such post-processing as blur effects and is typically invoked as a plurality of threads, with the plurality of threads being divided into thread groups. Finally, geometry that represents surfaces (or volumes) of objects in a scene is translated into pixels (picture elements), stored in a frame buffer, and then displayed on a display device 216.

Figure 3:
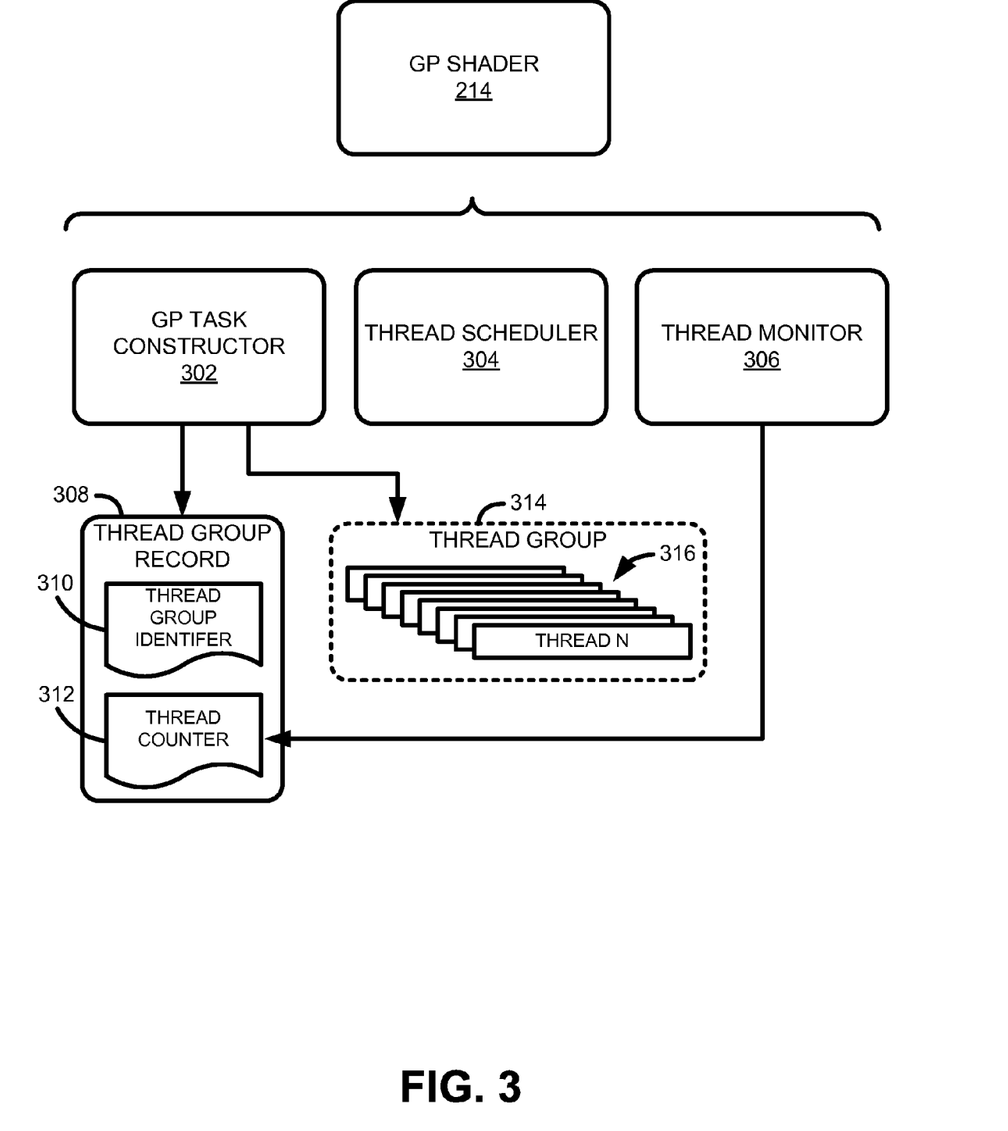
FIG. 3 depicts an embodiment of the GP shader of FIG. 2.

Reference is now made to FIG. 3, which depicts an embodiment of the GP shader 214 of FIG. 2. For some embodiments, the GP 214 shader comprises a GP task constructor 302, a thread scheduler 304, and a thread monitor 306. The GP task constructor 302 defines a thread group 314 comprising a plurality of threads 316 and creates a thread group record 308 associated with the thread groups 314. The thread group record 308 comprises a thread group identifier 310 and a thread counter 312 used for tracking execution of the various threads 316 in the thread group 314. The thread scheduler dispatches the plurality of threads 316 in the thread group 314 via a fork operation, where the plurality of threads 316 includes a main or leading thread and one or more sub-threads. Upon entering a join phase of execution in the GP shader 214, the thread monitor 306 is configured to monitor execution of each of the plurality of threads 316 and monitor arrival at predetermined synchronization points.

The thread counter 312 in the thread group record 308 is utilized to track the number of executed threads at these predetermined synchronization points. Upon synchronization of the threads 316, the thread scheduler 304 resumes execution of the plurality of threads 316 based on the value of the thread counter 312. For some embodiments, the thread counter 312 is initialized to the total number of threads 316 within the thread group 314. Once a join operation is invoked, the thread monitor 306 decrements the thread counter 312 every time a thread 316 arrives at a synchronization point (i.e., completes execution up to the synchronization point).

In this regard, one embodiment is directed to a graphics system 100 for performing synchronized execution of a plurality of software threads 316 in a GP shader 214 of a graphics pipeline 108. The system 100 comprises a GP task constructor 302 for creating a record 308 associated with a thread group 314 comprising a plurality of threads 316, wherein the record 308 comprises a thread group identifier 310 and a thread counter 312. The system 100 further comprises a thread scheduler 304 for dispatching the plurality of threads 316 in the thread group 314 via a fork operation, wherein the plurality of threads 316 comprise a main thread and one or more sub-threads. The system 100 also comprises a thread monitor 306 configured to monitor, based on a join operation, execution of each of the plurality of threads 316 and monitor arrival at predetermined synchronization points. For such embodiments, the thread counter 312 is utilized to track a number of executed threads at the predetermined synchronization points. Furthermore, the thread scheduler 304 resumes execution of the plurality of threads 316 in parallel based on the value of the thread counter 312.

Figure 4:
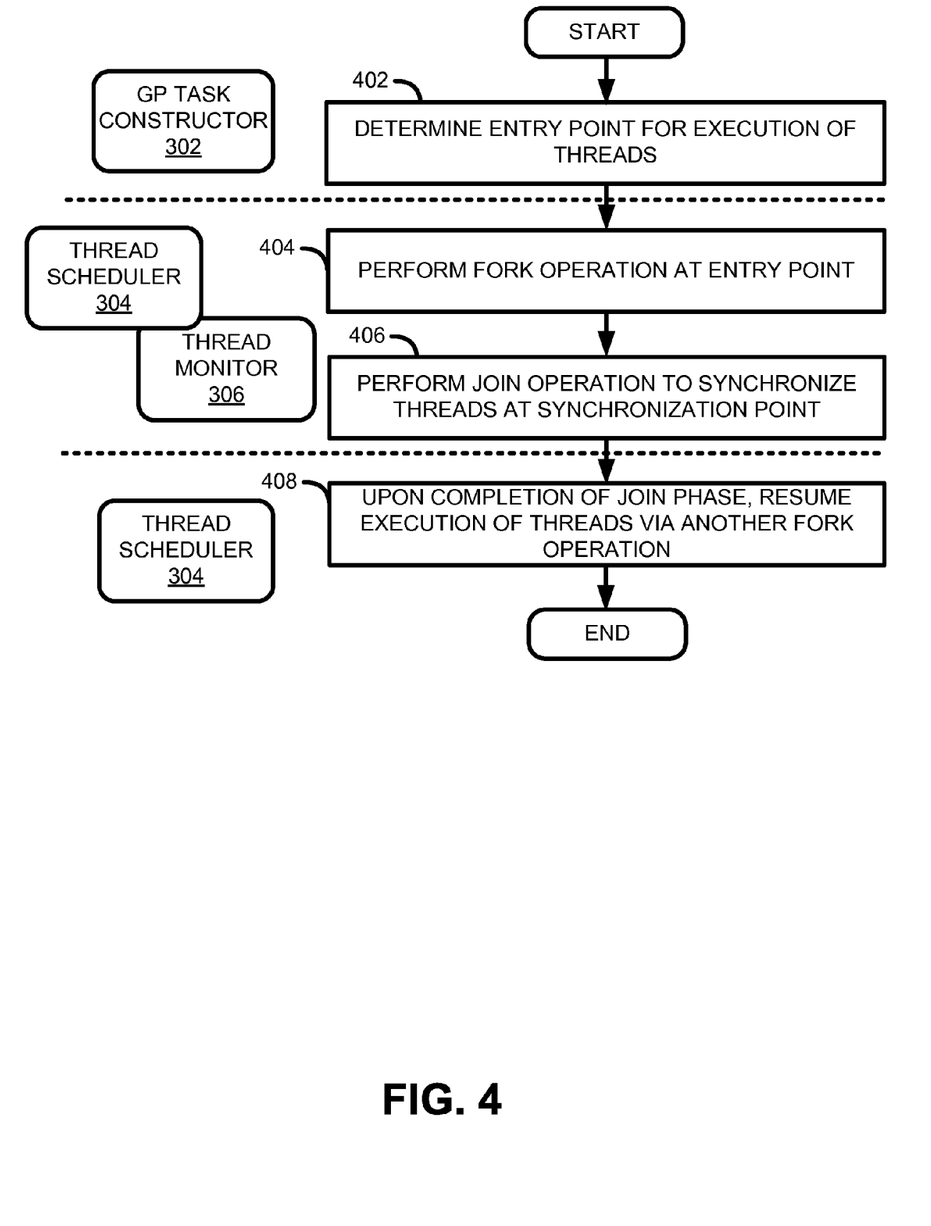
FIG. 4 depicts a flowchart for an embodiment for thread group kickoff using the various components shown in FIG. 3.

Reference is now made to FIG. 4, which depicts a flowchart for an embodiment for synchronizing threads using the various components shown in FIG. 3. Block 402 begins with the GP task constructor 302 determining an entry point for execution of the plurality of threads 316 in the GP shader 214. Generally, the entry point serves as the starting point in the GP shader 214 for the threads 316 to begin execution. In block 404, the thread scheduler 304 performs a fork operation at the entry point. The plurality of threads 316 comprise a main thread and one or more sub-threads. In this regard, tasks in the GP shader stage of the graphics pipeline 108 are kicked off as a single thread group 314. For some implementations, each thread group 314 may comprise up to 64 EU threads, or the equivalent of 1024 software threads. For some embodiments, the main or leading thread is dispatched prior to the remaining sub-threads, where the main thread may perform operations common to those in the sub-threads.

In block 406, the thread scheduler 304 performs a join operation to synchronize/re-synchronize the main thread and the sub-threads. During the join phase, the thread monitor 306 constantly updates the thread counter 312 in FIG. 3 to track the number of threads 316 that have completed execution up to a predetermined synchronization point. As described earlier, the thread counter 312 may be initialized to the total number of threads 316, and the thread monitor 316 may decrement the thread counter 312 every time a thread arrives. The threads that complete execution first are suspended until the remaining threads arrive (i.e., until the thread counter 312 reaches zero). Note that in alternative embodiments, the thread counter 312 may be initialized to zero, rather than the total number of threads, and incremented upon the arrival of a thread. In block 408, the thread schedule 304 resumes execution of the threads 316 upon completion of the join phase as all the threads 316 are now synchronized. The threads 316 may be dispatched by invoking another fork operation.

Thus, to summarize, one embodiment, among others, is a method for synchronizing a plurality of threads 316 in a general purpose shader in a graphics processor 102. The method comprises determining an entry point for execution of the threads 316 in the GP shader 214, performing a fork operation at the entry point, whereby the plurality of threads 316 are dispatched, wherein the plurality of threads 316 comprise a main thread and one or more sub-threads. The method further comprises performing a join operation whereby the plurality of threads 316 are synchronized upon the main thread reaching a synchronization point. Upon completion of the join operation, a second fork operation is performed to resume parallel execution of the plurality of threads 316.

Figure 5:
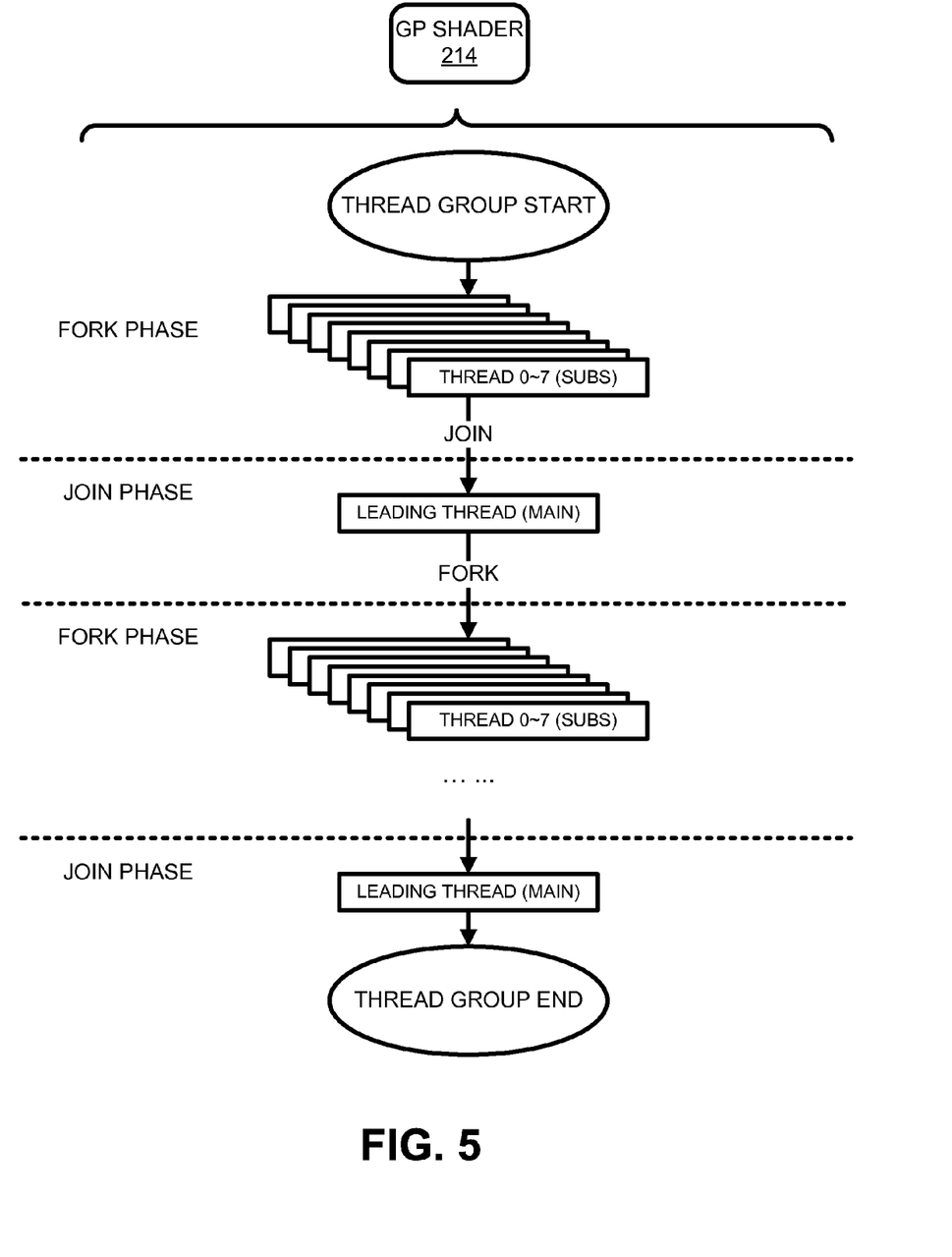
FIGS. 5-6 illustrate application of the fork and join operations described in relation to FIG. 4.
Figure 6:
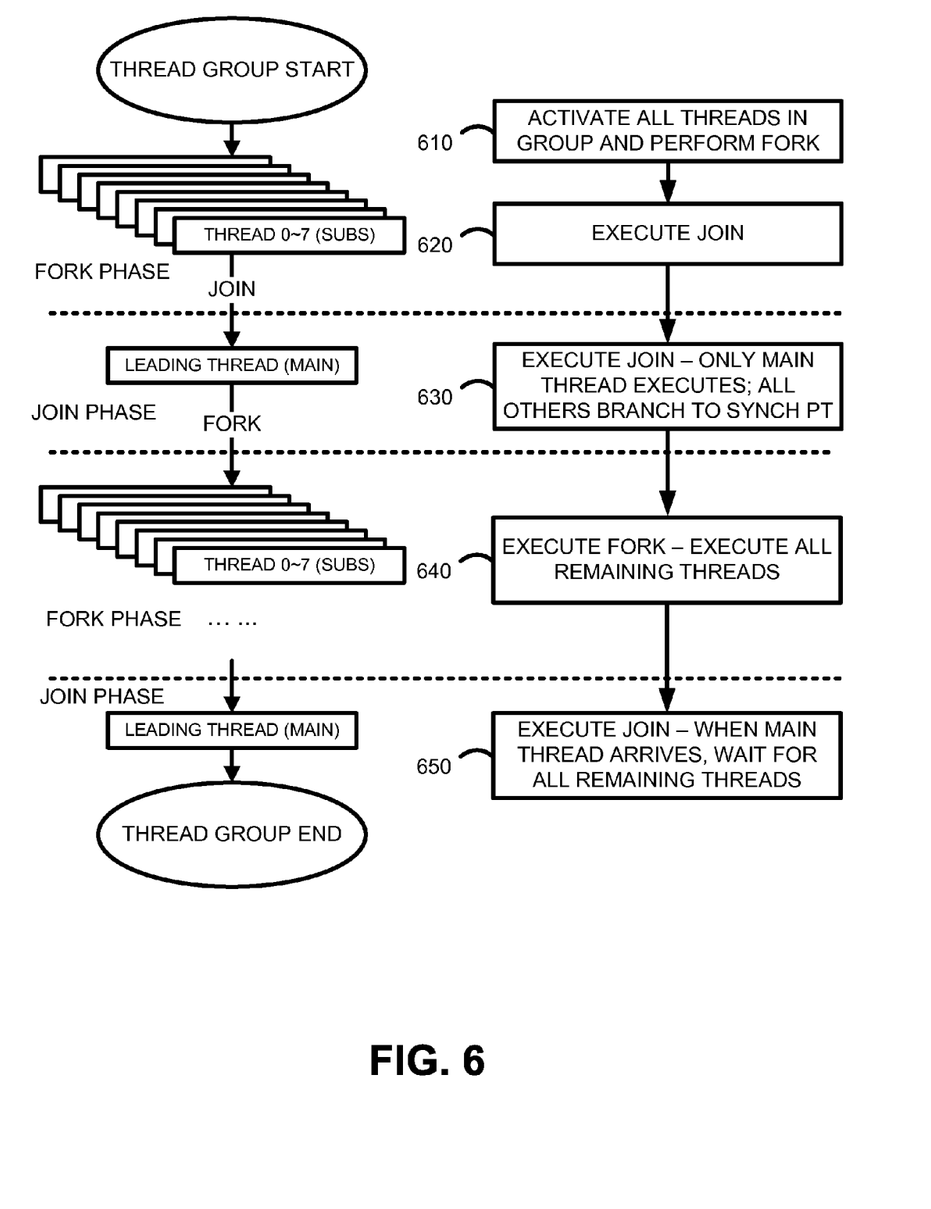

FIGS. 5-6 illustrate application of the fork and join operations described in relation to FIG. 4. The threads are shown transitioning between alternating fork and join phases. As described earlier, threads undergo kick off as a single thread group in the GP shader 214, which may include up to 64 EU threads, or the equivalent to 1024 software threads. Threads are assigned to a thread group by the GP task constructor 302 at kickoff. For threads belonging to the same thread group, fork and join operations are performed to synchronize the threads. For hardware simplicity, the GP shader 214 may begin with a fork operation in some implementations. fork and join operations may be implemented as instructions embedded within the GP shader 214 code at selected synchronization points. As shown in the transition from the fork phase to the join phase, when a join operation is invoked and the join phase begins, only the main or leading thread is executed.

For some embodiments, the main or leading thread may be the first thread within the thread group and may be assigned a thread index equal to 0. During execution, the main thread performs operations common to some or all the remaining sub-threads. The remaining sub-threads bypass the portion of code which the main thread executes and branches to the next synchronization point. Once all the threads are re-synched, a fork operation is invoked to activate the remaining sub-threads. As shown in the flow diagram, another join operation may follow the fork operation to resume execution. A non-limiting application of the fork and join operations in the context of a thread group relates to video decoding Inter-prediction, where every macroblock may be processed in a (4×4) pixel block as one thread using the fork/join operations.

With reference to FIG. 6, a thread group is kicked off and enters the fork phase. In block 610, the threads in an established thread group are activated and ready for execution. A fork operation is invoked, thereby dispatching all threads concurrently. To synchronize the threads, a join operation is invoked in block 520. At this juncture, only the main or leading thread is executed, while the remaining sub-threads branch directly to the next synchronization point (block 630). Once all the threads are accounted for at the synchronization point, block 640 proceeds by executing another fork operation to dispatch the threads again. As shown, another join operation may be invoked (block 650) to re-synch the threads. Again, during the join phase, only the main or leading thread undergoes execution while the remaining sub-threads branch directly to the next synchronization point.

Figure 7:
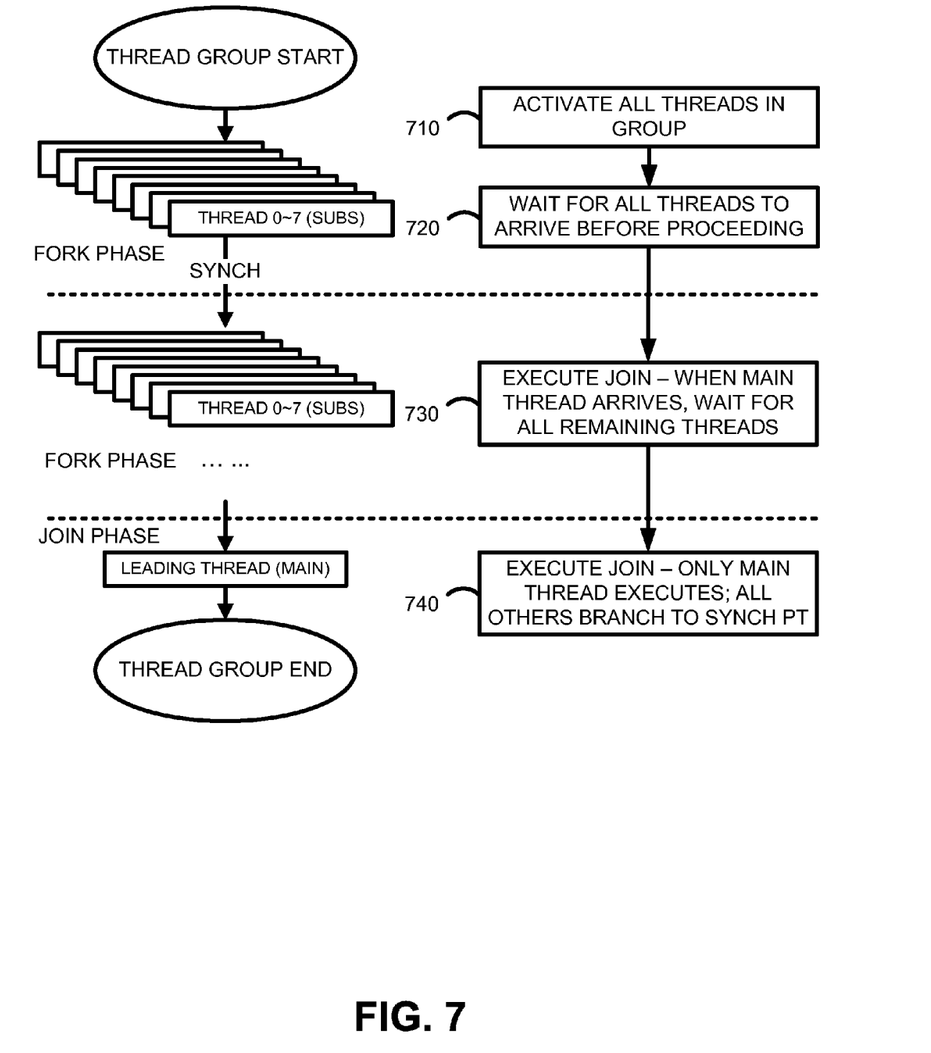
FIG. 7 shows an alternative embodiment of thread group kickoff, whereby two consecutive fork operations are invoked.

It should be noted that while the embodiments above have been described with the fork and join operations being invoked in an alternating fashion, other sequences of fork/join operations may be performed as well. FIG. 7 shows an alternative embodiment of thread group kickoff, whereby two consecutive fork operations are invoked. Beginning with block 710, all threads in the thread group are activated, and a fork operation is invoked to dispatch all the threads concurrently. For the embodiment shown, a synch operation is invoked, where threads that finish execution first are suspended until all the remaining threads complete execution (block 720). The synch operation is implemented in accordance with the "Direct3D 11 Compute Shader Functional Specification v 1.02" specification by MICROSOFT® and should be distinguished from the join operation described.

While the join and synch operations are similar from the standpoint that threads are suspended upon reaching a synchronization point or barrier, the join phase further comprises the main or leading thread executing a portion of code while the remaining sub-threads branch directly to the next synchronization point. In this regard, it should be noted that in the "DX11 Compute Shader" specification, threads within a particular thread group may undergo a series of synch operations. However, such synch operations must be resolved one by one and in sequence, thereby increasing computational resources that are needed. For the embodiments described, the use of fork and join operations do away with the need to resolve each thread on a thread-by-thread basis. Returning now to the embodiment shown in FIG. 7, it should be noted that while a synch operation (in accordance with the "DX11 Compute Shader" specification is shown, a fork operation and a join operation are also invoked (blocks 730 and 740). In this regard, a combination of known synch operations may be incorporated in conjunction with fork and join operations as described herein to perform synchronization among threads.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method executed by a processor for synchronizing a plurality of threads in a general purpose shader (GP) in a graphics processor, comprising:
   determining an entry point for execution of the threads in the general purpose shader;
   performing a fork operation at the entry point to concurrently dispatch the plurality of threads, wherein the plurality of threads comprise a main thread and one or more sub-threads;
   upon the main thread reaching a synchronization point, performing a join operation to synchronize the plurality of threads; and
   upon completion of the join operation, performing a second fork operation to resume parallel execution of the plurality of threads.

2. The method of claim 1, further comprising dispatching the main thread prior to dispatching the one or more sub-threads in parallel.

3. The method of claim 2, further comprising the main thread performing operations common to one or more of the plurality of threads.

4. The method of claim 3, wherein performing operations common to one or more of the plurality of threads takes place during a join phase of the GP shader.

5. The method of claim 3, wherein performing the fork operation at the entry point is performed after performing operations common to one or more of the plurality of threads.

6. The method of claim 1, further comprising creating a record for a thread group comprising the plurality of threads.

7. The method of claim 6, wherein the record comprises:
   a thread group identifier generated upon performing the fork operation at the entry point; and
   a thread counter for synchronizing the plurality of threads.

8. The method of claim 7, wherein the thread counter is initialized to the total number of threads in the thread group.

9. The method of claim 7, wherein the thread counter is initialized at the beginning of every join operation.

10. The method of claim 7, wherein the thread counter is initialized by first locating the associated record based on the thread group identifier.

11. The method of claim 1, wherein performing a join operation comprises:
   the main thread executing code in a designated join portion of the GP shader; and
   the remaining sub-threads branching directly to a next synchronization point and suspending execution until all the remaining sub-threads arrive at the next synchronization point.

12. A graphics system embodied in a non-transitory medium for performing synchronized execution of a plurality of software threads in a general purpose (GP) shader of a graphics pipeline, comprising:
- a GP task constructor for creating a record associated with a thread group comprising a plurality of threads, wherein the record comprises a thread group identifier and a thread counter;
- a thread scheduler for dispatching the plurality of threads in the thread group by invoking a fork operation, wherein the plurality of threads comprise a main thread and one or more sub-threads;
- a thread monitor configured to monitor, based on a join operation, execution of each of the plurality of threads and monitor arrival at predetermined synchronization points,
- wherein the thread counter is utilized to track a number of executed threads at the predetermined synchronization points, and wherein the thread scheduler resumes execution of the plurality of threads in parallel based on the value of the thread counter.

13. The system of claim 12, wherein the thread scheduler dispatches the main thread prior to dispatching the one or more sub-threads, wherein the one or more sub-threads are dispatched in parallel.

14. The system of claim 12, wherein the thread scheduler initializes the thread counter at the beginning of every join operation, and wherein the thread counter is initialized to the total number of threads in the thread group.

15. The system of claim 14, wherein the thread counter is initialized by first locating the associated record based on the thread group identifier.

16. The system of claim 14, wherein the thread monitor decrements the thread counter upon arrival of a thread at each of the predetermined synchronization points.

17. A non-transitory computer-readable medium having a programmable general purpose (GP) shader for thread synchronization, the GP shader being configured to perform:
- assembling a thread group comprising a plurality of threads, wherein the group of threads comprises a main thread and a plurality of sub-threads;
- creating a record associated with the thread group, wherein the record comprises a thread group identifier and a thread counter for tracking execution of each of the plurality of threads;
- performing a thread group kickoff by performing a fork operation, wherein the fork operation comprise dispatching the main thread followed by the plurality of sub-threads;
- performing a join operation by synchronizing the plurality of threads at one or more synchronization points; and
- resuming execution of the plurality of threads by performing another fork operation.

18. The computer-readable medium of claim 17, wherein the main thread executes operations common to one or more of the plurality of threads.

19. The computer-readable medium of claim 17, wherein the GP shader is further configured to perform:
- initializing the thread counter according to the number of threads in the thread group; and
- decrementing the thread counter upon arrival of threads at the one or more synchronization points.

20. The computer-readable medium of claim 17, wherein performing a join operation by synchronizing the plurality of threads at one or more synchronization points comprises:
- the main thread executing code in a join portion of the GP shader; and
- the remaining sub-threads branching directly to a next synchronization point and suspending execution until all the sub-threads arrive at the next synchronization point.

* * * * *